(12) United States Patent
Baacke

(10) Patent No.: US 8,875,315 B2
(45) Date of Patent: Nov. 4, 2014

(54) GARMENT WITH EXTERIOR TOUCH-SENSITIVE FEATURES

(75) Inventor: Dennis Baacke, Irma, WI (US)

(73) Assignee: JMI Sportswear Pte. Ltd., Singapore (SG)

( * ) Notice: Subject to any disclaimer, the term of this patent is extended or adjusted under 35 U.S.C. 154(b) by 400 days.

(21) Appl. No.: 13/196,408

(22) Filed: Aug. 2, 2011

(65) Prior Publication Data

US 2012/0096620 A1 Apr. 26, 2012

Related U.S. Application Data

(60) Provisional application No. 61/420,063, filed on Dec. 6, 2010, provisional application No. 61/420,061, filed on Dec. 6, 2010, provisional application No. 61/406,310, filed on Oct. 25, 2010.

(51) Int. Cl.
| | | |
|---|---|---|
| *A41D 19/00* | (2006.01) | |
| *G06F 3/01* | (2006.01) | |
| *G06F 3/041* | (2006.01) | |
| *A41D 1/00* | (2006.01) | |
| *A41D 19/015* | (2006.01) | |
| *A41D 13/08* | (2006.01) | |

(52) U.S. Cl.
CPC .............. *A41D 1/005* (2013.01); *G06F 3/014* (2013.01); *A41D 13/087* (2013.01); *G06F 3/041* (2013.01); *A41D 19/01594* (2013.01)
USPC .................................................. 2/160; 2/163

(58) Field of Classification Search
USPC .......................................... 2/16, 20, 160, 163
See application file for complete search history.

(56) References Cited

U.S. PATENT DOCUMENTS

| | | | | |
|---|---|---|---|---|
| 6,128,004 | A | * 10/2000 | McDowall et al. | ............ 345/158 |
| 6,338,162 | B1 | 1/2002 | Geng | |
| 8,400,256 | B2 | * 3/2013 | Matthews | ........................ 338/99 |
| 2002/0130673 | A1 | 9/2002 | Pelrine et al. | |
| 2002/0163495 | A1 | 11/2002 | Doynov | |
| 2005/0151722 | A1 | 7/2005 | Meteyer | |
| 2005/0229284 | A1 | * 10/2005 | Gaetz | ................................ 2/159 |
| 2005/0231471 | A1 | 10/2005 | Mallard et al. | |
| 2007/0136925 | A1 | 6/2007 | Bell | |
| 2007/0245454 | A1 | * 10/2007 | Eklund | ........................... 2/161.6 |
| 2008/0282446 | A1 | 11/2008 | Komlos | |
| 2009/0000010 | A1 | * 1/2009 | Sunder et al. | ...................... 2/163 |
| 2009/0066658 | A1 | 3/2009 | Earl | |
| 2009/0183297 | A1 | * 7/2009 | Drosihn | ........................... 2/167 |
| 2010/0039392 | A1 | 2/2010 | Pratt | |
| 2010/0090966 | A1 | 4/2010 | Gregorio | |

FOREIGN PATENT DOCUMENTS

WO 2005102088 A1 11/2005

OTHER PUBLICATIONS

Laurie A. Duncan, iGlove Multi iPod Gloves, website http://www.tuaw.com/2006/12/12/iglove-multi-ipod-gloves/, Oct. 5, 2011.

* cited by examiner

*Primary Examiner* — Katherine Moran
(74) *Attorney, Agent, or Firm* — Boyle Fredrickson, S.C.

(57) ABSTRACT

A garment including a shell adapted to receive a portion of a body of a wearer therein, the shell having an interior surface, an exterior surface and an aperture for receiving the body portion of the wearer and at least one conductive member disposed on the exterior surface of the shell. The at least one conductive member is formed with sufficient conductive mass to generate a signal recognizable by a touch-sensitive device without direct contact of the at least one conductive member with the wearer.

15 Claims, 3 Drawing Sheets

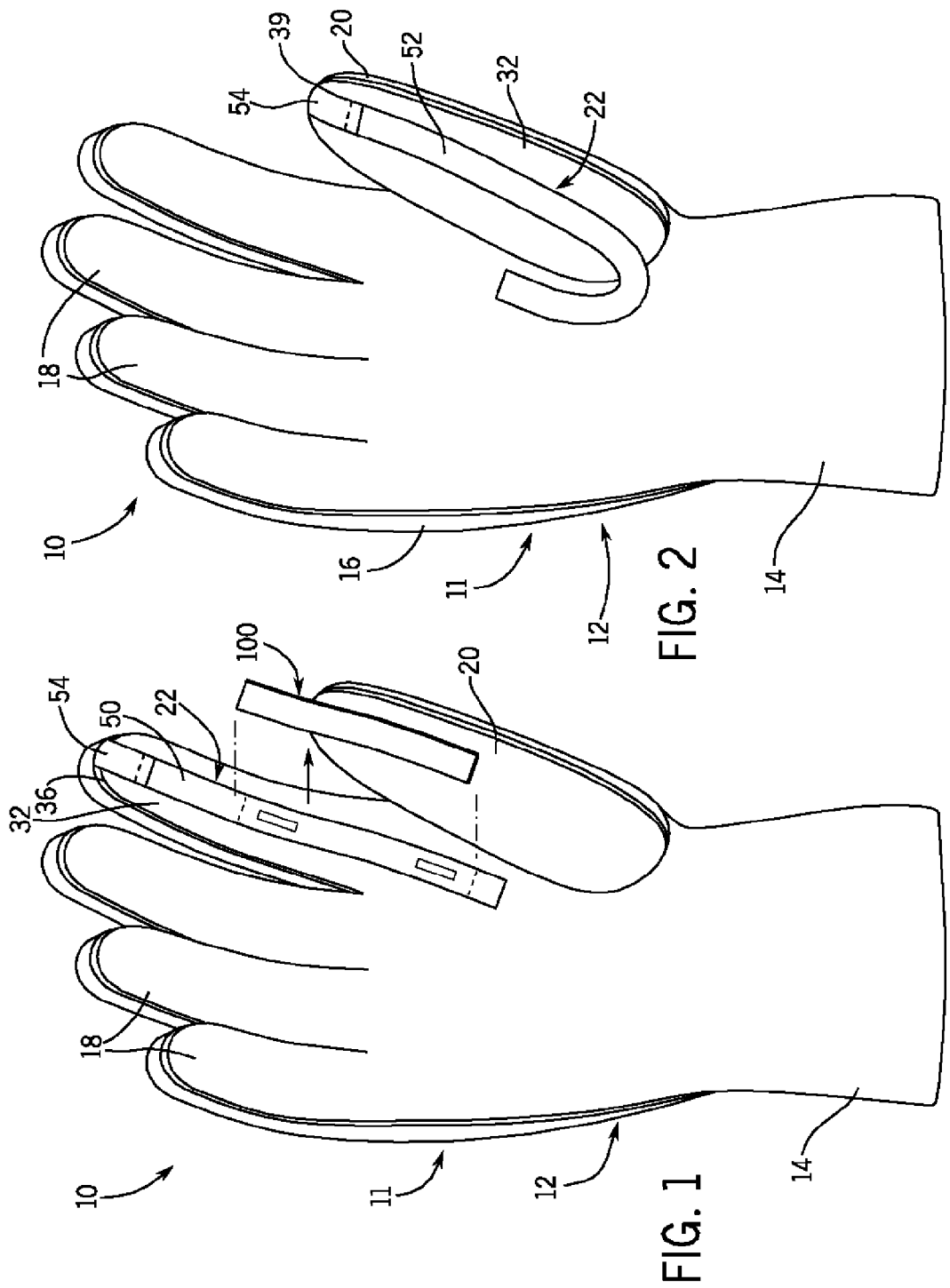

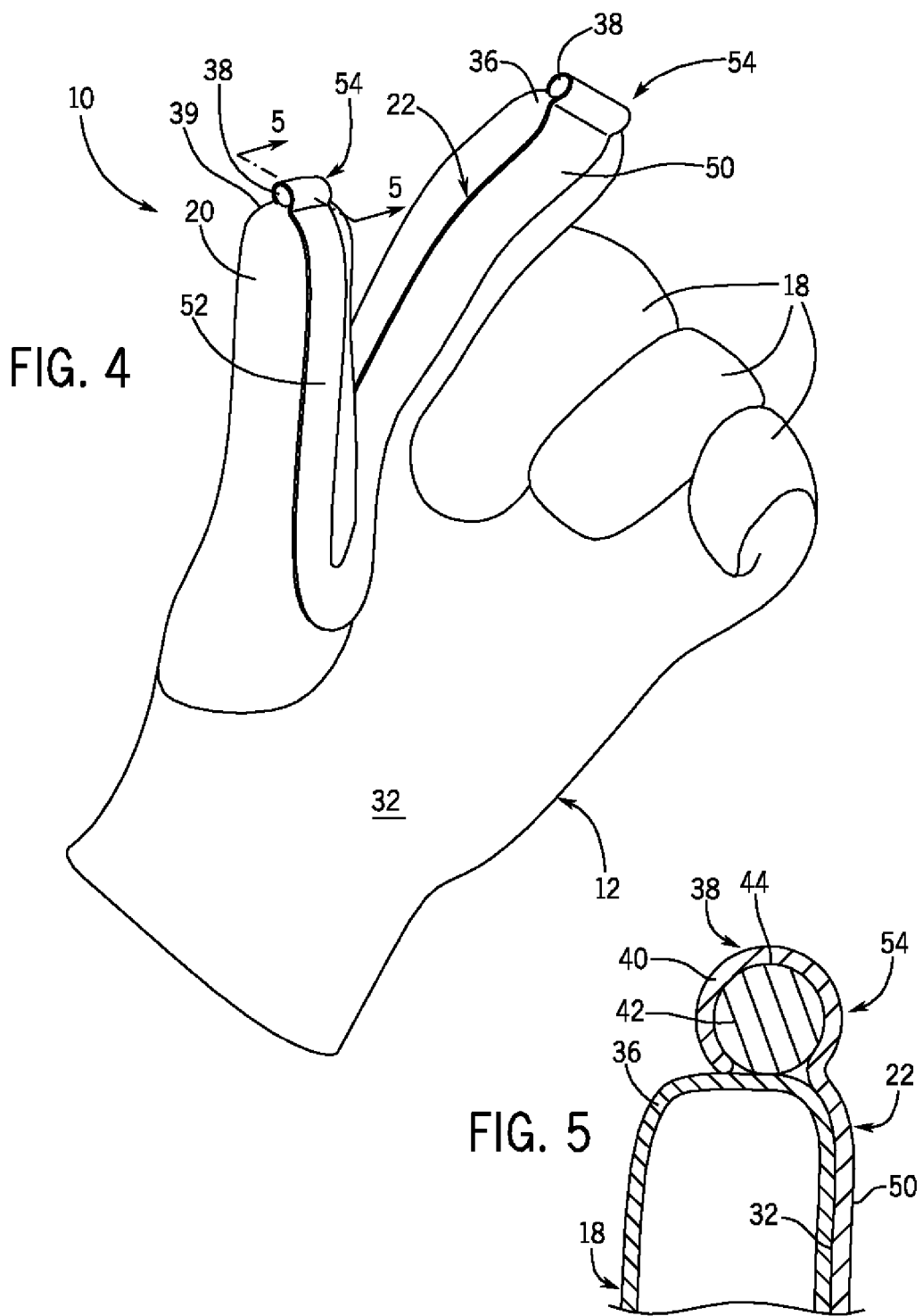

GARMENT WITH EXTERIOR TOUCH-SENSITIVE FEATURES

CROSS-REFERENCE TO RELATED APPLICATIONS

This application claims priority from U.S. Provisional Application Ser. No. 61/420,063, filed on Dec. 6, 2010, U.S. Provisional Application Ser. No. 61/420,061, filed on Dec. 6, 2010, and U.S. Provisional Application Se. No. 61/406,310, filed on Oct. 25, 2010, the entirety of which are each expressly incorporated herein by reference.

FIELD OF THE INVENTION

The present invention relates generally to a garment, and more specifically to a garment having touch-sensitive features.

BACKGROUND OF THE INVENTION

There are many types of electronic devices that are used for various reasons, including but not limited to, communications, entertainment, work, and maintaining information such as contacts and appointments. Many electronic devices are continuously decreasing in size while increasing in functionality. In addition, several of these types of electronic devices are portable, including phones, pagers, communicators, electronic organizers, personal digital assistants, and digital audio and/or video playing devices such as iPods® or MP3 players.

As a result of the decreasing size of the devices, the controls for the devices have correspondingly shrunk in size. The particular controls and methods of input for different electronic devices can vary. Some devices may include mechanical or electromechanical buttons or switches that can be activated by a user contacting the button or switch.

Other electronic devices utilize a touch-sensitive technology for the interaction between the user and the device. One example of a touch sensitive technology is a touch screen which is an interactive screen that can be contacted by a user. Another example of a touch-sensitive technology is a track pad. The touch-sensitive technologies or applications sense and track a user's touch and its subsequent movement.

Some of the applications of these touch-sensitive technologies are resistive-type systems that include a resistive layer of material and a conductive layer of material that are disposed proximate to each other and separated by a narrow space of air. When a user touches a resistive-type screen or pad, the two layers contact each other in that exact spot, thereby changing the electric field and the particular spot can be identified. Thus, a resistive-type system registers a touch or input as long as the two layers make contact. The contact can be made using any type of object.

Other applications of these touch-sensitive technologies are capacitive-type systems that include a conductive layer of material that stores an electrical charge. When a user touches a capacitive-type screen or pad, a portion of the charge is transferred between the user and the screen or pad. As a result, the charge on the capacitive layer changes. Once this change occurs, the particular location of the change can be determined by a controller. A capacitive system needs a conductive input to register a touch or input. Such a conductive input can be made using a portion of a user's body, such as a finger.

In an electronic device with a capacitive-type touch-sensing interface, a controller supplies electrical current to metal channels or conductors that form a grid and conduct electricity. When another conductor, such as a user's finger, is moved close to the grid, current wants to flow to the finger to complete a circuit. Typically, the electronic device includes a non-conductive item, such as a non-conductive piece of plastic, in the way. Thus, a charge builds up at a point on the grid that is the closest to the finger. The build up of electrical charge between two conductors is called capacitance. The controller of the electronic device measures any changes in capacitance and a signal is generated and sent to the microprocessor of the electronic device.

When resistive-type and capacitive-type touch-sensing technologies are utilized on electronic devices, these touch-sensing technologies use capacitive and resistive buttons which can replace the small mechanical button and switch input devices to maximize the available space on the device. As mentioned above, capacitive touch-sensing requires a conductive input to register a touch by a user. While a conductive input can be accomplished through the touch of a user, such a conductive input is difficult when a user is wearing a garment covering the portion of the user's body intended to provide the conductive input, such as a hand covering.

Garments, such as hand coverings including gloves and mittens, are worn for protection from cold weather or other environmental conditions. There is a decrease in tactile sensitivity in the touch-sensitive technologies utilized as input mechanisms for the devices when a user is wearing a conventional garment. In addition, conventional garments do not allow a user to provide a necessary conductive input to an electronic device. Accordingly, to operate and utilize many electronic devices, a user must remove the garment in order to effectively interact with the devices having touch-sensitive control inputs.

In an attempt to remedy this situation, certain garments have been developed that enable the wearer to interact with a touch-sensitive (resistance or conductive) input device without removing the garment by replacing portions of the material forming the garment with section of a conductive material. However, while this enables the individual wearing the garment to interact with the device, if the garment is to be formed to be weatherproof, waterproof, or otherwise protect the wearer from contact with the elements, for example, the replacement of the material of the garment with the conductive material necessarily creates a gap in the impervious material from which the garment is formed, such that there is the potential for water or other material to enter the interior of the garment.

Additionally, with many types of garments, the primary function of the garment is to protect, insulate or otherwise isolate the wearer within the garment from the outside environment. Garments of this type normally have multiple layers forming the garment to provide the necessary protection for the wearer. However, these multiple layers can prevent conductive materials from being able to transmit electric signals from the body of a wearer through all of the various layers in order to enable the wearer to interact with or control a capacitive or conductive input-sensing device while wearing the garment.

Thus, it is desirable to develop a garment that enables the wearer to provide conductive input to an electronic device, but that also has a uniform and unbroken layer surrounding the body portion of the wearer on which the garment is positioned, such that the garment is effectively weatherproof or waterproof.

SUMMARY OF THE INVENTION

Briefly described, one aspect of the present invention provides a garment, such as a hand covering including several finger receptacles and a thumb receptacle. The garment also includes at least one tactility component or conductive member coupled thereto. In one embodiment, the conductive member is formed from one or more materials that facilitate the transmission of a conductive input to an electronic device. The conductive member extends along the exterior of the garment such that the component can readily be positioned in direct contact with an electronic device. The amount or mass of the conductive material forming the conductive member positioned on the exterior of the garment is sufficient to create an input that is detectable by the resistance or conductive-based touch-sensitive technology forming the input on the device, enabling the wearer to interact with the device via the conductive member. Thus, instead of having to remove the garment to directly contact the device, or to have a conductive member that penetrates the garment and violates the integrity of the garment, the conductive member, based on its mass, is able to provide a detectable input to the device without any direct contact of the device with the body of the wearer.

According to another aspect of the present invention, the garment has a projection extending from one or more portions of the garment. The projection is operably connected to the conductive member in order to enable signals generated by the component to be transmitted through the conductive member to the projection. The form of the projection allows the signal to be directed precisely onto the resistance or conductive-based touch-sensitive technology forming the input on the device to enable the wearer to closely and accurately control the operation of the device. In addition, the form of the projection provides a visual indication to the wearer of the point of contact of the projection with the input of the device.

Numerous other aspects, features, and advantages of the present invention will be made apparent from the following detailed description together with the drawings figures.

BRIEF DESCRIPTION OF THE DRAWINGS

The drawings illustrate the best mode currently contemplated of practicing the present invention.

In the drawings:

FIG. 1 is a front isometric view of a one embodiment of a garment constructed according to the present disclosure;

FIG. 2 is a front isometric view of a second embodiment of the garment and conductive member of FIG. 1;

FIG. 4 is a front isometric view of a fourth embodiment of the garment and conductive member of FIG. 1; and FIG. 5 is a cross-sectional view along line 5-5 of FIG. 4.

DETAILED DESCRIPTION OF THE INVENTION

Figure 3:
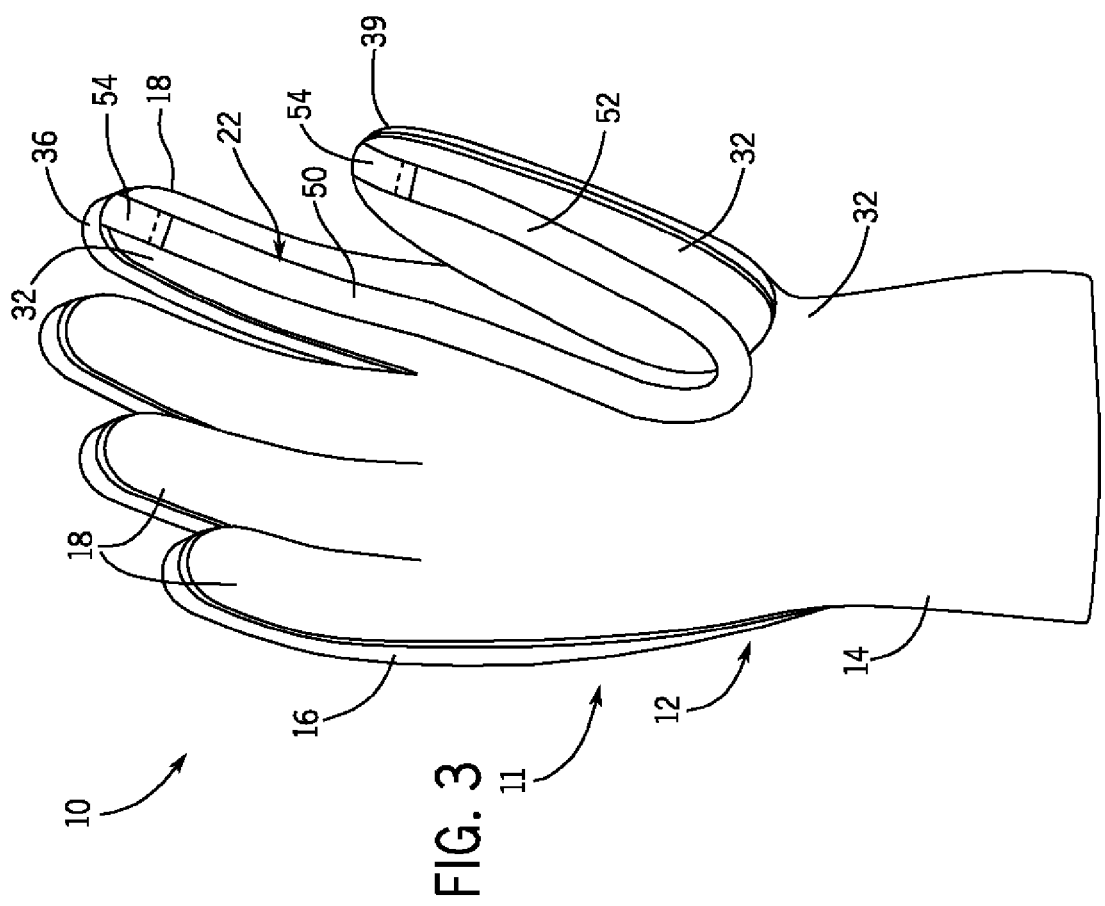
FIG. 3 is a front isometric view of a third embodiment of the garment and conductive member of FIG. 1.

Referring now in detail to the drawing figures, wherein like reference numerals represent like parts throughout the several views, one embodiment of a garment constructed according to the present disclosure is illustrated generally at 10. The garment 10, which in this embodiment is formed as a glove 11 but can also be any type of garment worn by an individual, includes a shell 12 formed of a suitable waterproof or weather proof material. The shell 12 is shaped to conform to the portion of the body of the wearer on which the garment 10 is to be worn. In the illustrated embodiment, the shell 12 is formed to conform to the shape of a hand with a palm portion 14, a back portion 16, a number of finger stalls 18 and a thumb stall 20. In one embodiment, the shell 12 is formed as a single member, without any breaks in the shell 12 such that the shell 12 provides continuous waterproof and/or weatherproof protection over the entire hand of the wearer, though a shell 12 formed of multiple components joined to one another to form the unitary or single member is also contemplated.

Referring now to FIGS. 1-2, the garment 10 additionally includes a conductive member 22. In a first embodiment shown in FIG. 1, the conductive member 22 is formed of a flexible and electrically conductive material such that electrical signals can pass along the conductive member 22, such as a sufficient number of conductive material threads or mass of conductive adhesive (not shown) applied to the shell 12 in any suitable manner. The conductive member is positioned along the exterior surface 32 of the finger stall 18, such that the manipulation of the finger stall 18 by the wearer also manipulates the conductive member 22 in a corresponding manner. In a second embodiment shown in FIG. 2, the conductive member 22 is positioned on the exterior surface 32 of the thumb stall 20. Additionally, while the conductive members 22 are shown in the embodiments of FIGS. 1 and 2 on the palm portion 14 of the shell 12, it is also contemplated that the members 22 can be disposed on the back portion 16.

Referring now to FIG. 3, a third embodiment of the conductive member 22 that includes a first conductive portion 50 and a second conductive portion 52. The first portion 50 and second portion 52 are formed of a suitable conductive material, which in one embodiment is formed from a silver plated or copper/polyester taffeta strip material that is 0.08 mm in thickness with a mass of 80 g/m$^2$. In this embodiment, the first portion 50 is approximately 5" in length and 0.5" in width, and extends from a tip 36 of the finger stall 18, while the second portion 52 is approximately 5" in length and 0.5" in width, and is attached between the tip 39 of the thumb stall 20 and the first portion 50, where the first portion 50 and second portion 52 are optionally joined approximately at the thumb crotch 41. Further, while the first portion 50 and the second portion 52 are illustrated as being formed unitarily with one another, the first portion 50 and second portion 52 can also be formed separately from one another and attached to one another in an electrically conductive manner.

As shown in FIG. 3, at each tip 36 and 39, respectively, the first portion 50 and second portion 52 are joined to a contact 54. In one embodiment, the contacts 54 are each formed of a suitable conductive material, such as a silver plated polyester/Lycra® fabric that is 0.50 mm in thickness with a mass of 130 g/m$^2$ that is approximately 0.75" in length and 2" in width strip, and is folded to form the contact 54. The first portion 50 and second portion 52 are joined to the contacts 54 in an electrically conductive manner just below the tip 36, 39 of the finger stall 18 or thumb stall 20.

For both contacts 54, the contacts 54 are positioned on the exterior surface 32 at a location where the contacts 54 can interact with an input or control element (not shown) of an electronic device (not shown), including, but not limited to, phones, pagers, communicators, electronic organizers, personal digital assistants, tablet computers and digital audio and/or video playing devices such as iPods® and MP3 players, among other types of devices.

In the embodiments shown in FIGS. 1-3, the total conductive mass of the first portion 50 and second portion 52 (if present), optionally along with the mass of the contacts 54, is sufficient to generate an electric signal when the contacts 54 are in contact with a touch-sensitive device to that is recognizable by, and can operate the device without having any direct contact of the first portion 50, second portion 52 or contacts 54 with the body of the wearer. In this manner the wearer can interact with the device using the garment 10 without removing the garment 10, and without the garment 10 being formed with any apertures, holes or other points of entry into the garment 10 that could compromise the integrity of the waterproof and/or weatherproof properties, etc., of the garment 10. Additionally, the lengths of the first portion 50, the second portion 52 and contacts 54 can be varied as desired, such as to accommodate the particular form of the garment 10 to which they are attached, or can be formed with different conductive materials, so long as the entirety of the conductive member 22, in light if its length and composition, has sufficient conductive mass to function in the intended manner.

In order to engage and provide input to the device, the wearer manipulates the finger stall 18 or thumb stall 20 on which the contacts 54 are located to place one or more of the contacts 54 or the first portion 50 and/or second portion 52 in contact with the control element or input (not shown) of the device. Where the control element of electronic device is or includes a capacitive-type touch-sensing interface, the first portion 50 and second portion 52 operate to generate a conductive signal that is transmitted to the contacts 54 disposed in contact with the capacitive-type touch-sensing interface to operate the interface.

In alternative embodiments to those previously described, instead of the conductive member 22 being formed from a fabric-like material, the member 22 can be formed from a flowable material with conductive properties, such as a conductive ink or adhesive positioned on the exterior surface 32 of the shell 12, such as by printing the ink or adhesive thereon. In addition, multiple conductive members 22 can be disposed on the various portions of the shell 12 to form multiple separate or connected points of contact on the exterior surface 32 of the shell 12, each of which has sufficient mass to be capable of providing a recognizable signal to a touch-sensitive interface on a device, without the need for the wearer to remove the garment 10 including the shell 12 and the members 22.

Looking now at FIGS. 4 and 5, to more specifically focus the signals generated by the member 22 to more precisely control the device via the touch-sensitive interface, in a fourth embodiment for the conductive member 22, each contact 54 includes a projection 38 disposed on the tip 36, 39 of the stall 18, 20. In one embodiment, the projection 38 includes an outer portion 40 and an inner portion 42, thought the projection can be formed entirely by the material of the outer portion 40 is desired. The outer portion 40 is operably connected to the conductive member 22 at the tip 36 of the stall 18. In one embodiment, the signals travelling along the member 22 can be conducted onto the outer portion 40, which is also formed from a conductive material. Additionally, the outer portion 40 can be formed as an extension of the conductive member 22.

The outer portion 40 is affixed to the tip 36 of the finger stall 18 by any suitable means such as by stitching or an adhesive, among others, and either partially or totally covers the inner portion 42. The inner portion 42 is disposed against and secured to the tip 36 of the stall 18 in any suitable manner and projects outwardly therefrom. The inner portion 42 has a shape that tapers or narrows from the tip 36 towards the outermost end 44 of the inner portion 42, e.g., the inner portion 42 can be inwardly angled or curved. The tapering of the inner portion 42 to the outermost end 44 provides a narrow engagement surface for the conductive member 22/outer portion 40 that is capable of engaging or contacting a touch-sensitive interface on a device. The outer portion 40 is positioned over the inner portion 42 and secured in that position, such that the outer portion 40 conforms to the shape of the inner portion 42, thus providing the outermost end 44 as a single, small contact point for the contact 54 and conductive member 22 on the tip 36.

In this manner the projection 38 provides a contact point on the garment for the conductive member 22 that enables very precise contact of the conductive member 22, via the outer portion 40 of the projection 38, with the touch-sensitive interface of the conductive device, such that a wearer can precisely control the device via the interface without having any stray or multiple contact points between the conductive member 22 and the device interfering with the wearer's control of the device. Additionally, the form and placement of the projection 38 on the tip 36 enables the wearer to see the outermost end 44 of the projection 40 opposite the tip 36, such that the wearer can precisely direct the end 44 of the projection 40 into engagement with the device. In one embodiment, the projection 40 is positioned on the tip 36 closer to the back portion 16 of the glove 10, such that the projection 40 is disposed in a more visible location when the garment 20 is in use.

In alternative embodiments, as opposed to a single layer garment formed exclusively by the shell 12, the shell 12 can form an inner liner or other part of a multilayer garment 10. In this embodiment, the conductive member(s) 22 is disposed on the exterior of the shell 12 such that the wearer does not contact the member 22, but the conductive member 22, projection 38 and/or contact 54 can project outwardly from the outer layers (not shown) in order to be positionable in contact with a touch-sensitive interface of an electronic device.

In still another embodiment, the conductive member 22 can be formed to have a separable component 100 (FIG. 1) that can be removed from the garment 10 and used as a separate conductive member for engagement with a conductive device, such as a stylus. The component 100 can be adhered to the garment 10 and/or to the remainder of the conductive member 22 on the garment 10 in any suitable manner, such as by a hook and loop attachment mechanism. In addition, the separable component 100 can be formed with a configuration different than that of the remainder 100 of the conductive member 22. For example, in an embodiment where the remainder 100 of the conductive member 22 is formed of a flexible strip of a conductive material, the separable component 100 can be formed with a more rigid, tubular or rod-like construction that can effectively connect and conduct signals when engaged with the remainder 100 conductive member 22 on the garment 10, but that can also provide a relatively rigid construction when used separately from the garment 10. With this construction, the mass of the remainder or non-separable component 100 of the conductive member 22 secured to the garment 10 can be reduced, as the separable component 100 can be formed with a greater share of the mass required to generate the electric signals passing along the conductive member 22 for operating a device.

Various other embodiments of the present invention are contemplated as being within the scope of the filed claims particularly pointing out and distinctly claiming the subject matter regarded as the invention.

The invention claimed is:

1. A garment comprising:
   a) a shell adapted to receive a portion of a body of a wearer therein, the shell having an interior surface, an exterior surface and an aperture for receiving the body portion of the wearer;
   b) at least one conductive member disposed on the exterior surface of the shell, the at least one conductive member having sufficient conductive mass to generate a signal recognizable by a touch-sensitive device without direct contact of the at least one conductive member with the wearer, wherein the shell forms an outer layer of the garment and wherein the shell has no openings extending through the shell, wherein the at least one conductive member is formed from a conductive fabric material and is affixed to a projection disposed on the exterior surface of the shell and wherein the projection includes an inner portion secured to the exterior surface of the shell and an outer portion secured to the inner portion.

2. The garment of claim 1 wherein the inner portion has an inwardly tapering shape.

3. The garment of claim 2 wherein the inner portion is tubular in shape, with the inner portion positioned lengthwise on the shell.

4. The garment of claim 1 wherein the outer portion is integrally formed with the conductive member.

5. The garment of claim 1 further comprising a first conductive member disposed on the exterior surface and a second conductive member disposed on the exterior surface and spaced from the first conductive member.

6. The garment of claim 5 wherein the first conductive member and the second conductive member are operably connected to one another.

7. The garment of claim 6 wherein the first conductive member and the second conductive member have a mass of at least 0.235g.

8. The garment of claim 1 further comprising a contact disposed on the exterior surface of the shell and formed of a conductive material, the contact operably connected to the at least one conductive member.

9. The garment of claim 8 wherein the at least one conductive member and the contact have a mass of at least 0.255g.

10. The garment of claim 1 wherein the at least one conductive member has a mass of at least 0.129g.

11. The garment of claim 1 wherein the shell is formed as a unitary structure.

12. The garment of claim 11 wherein the shell forms an outer layer of a multilayer garment.

13. A method of interacting with an electronic device having a touch-sensitive interface, the method comprising the steps of:
 a) providing the garment of claim 4;
 b) inserting the body portion of the wearer through the aperture; and
 c) placing the at least one conductive member in contact with the touch-sensitive device.

14. The garment of claim 1 wherein the at least one conductive member includes a separable component removable from the garment for use with a conductive device.

15. A garment comprising:
 a) a shell adapted to receive a portion of a body of a wearer therein, the shell having an interior surface, an exterior surface and an aperture for receiving, the body portion of the wearer;
 b) at least one conductive member disposed on the exterior surface of the shell, the at least one conductive member having sufficient conductive mass to generate a signal recognizable by a touch-sensitive device without direct contact of the at least one conductive member with the wearer. wherein the shell forms an outer layer of the garment and wherein the shell has no openings extending through the shell, wherein the at least one conductive member is formed of a flowable material capable of adhering to the exterior surface of the shell and is affixed to a projection disposed on the exterior surface of the shell and wherein the projection includes an inner portion secured to the exterior surface of the shell and an outer portion secured to the inner portion.

* * * * *